US012359781B2

(12) United States Patent
Marcucci et al.

(10) Patent No.: US 12,359,781 B2
(45) **Date of Patent: *Jul. 15, 2025**

(54) HAND HELD SPOTLIGHT

(71) Applicant: Alliance Sports Group, L.P., Roanoke, TX (US)

(72) Inventors: Todd Lee Marcucci, Mansfield, TX (US); Clark McCune, Roanoke, TX (US); Jimmy Prieto, Trophy City, TX (US); James Brandon Roach, Keller, TX (US)

(73) Assignee: Alliance Sports Group, L.P., Roanoke, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/780,058

(22) Filed: Jul. 22, 2024

(65) Prior Publication Data

US 2025/0020290 A1 Jan. 16, 2025

Related U.S. Application Data

(63) Continuation of application No. 18/460,990, filed on Sep. 5, 2023, now Pat. No. 12,044,368, which is a continuation of application No. 17/846,875, filed on Jun. 22, 2022, now abandoned.

(60) Provisional application No. 63/242,799, filed on Sep. 10, 2021.

(51) Int. Cl.

| | |
|---|---|
| ***F21L 4/00*** | (2006.01) |
| ***F21V 9/30*** | (2018.01) |
| *F21Y 113/20* | (2016.01) |
| *F21Y 115/10* | (2016.01) |

(52) U.S. Cl.

CPC ................ *F21L 4/005* (2013.01); *F21V 9/30* (2018.02); *F21Y 2113/20* (2016.08); *F21Y 2115/10* (2016.08)

(58) Field of Classification Search

CPC ......... F21L 4/045; F21L 14/02; F21L 14/023; F21L 4/005; F21V 23/0414; F21V 21/0885; F21V 21/406; F21V 9/30; F21Y 2115/10

See application file for complete search history.

(56) References Cited

U.S. PATENT DOCUMENTS 4,963,798 A * 10/1990 McDermott ........... H05B 45/00 362/240
6,357,893 B1 * 3/2002 Belliveau ................ H01L 25/13 362/184
7,121,678 B1 * 10/2006 Shetter .................... F21S 9/022 362/240
7,387,402 B1 * 6/2008 Lui (Phillip) ......... F21V 17/164 362/180
8,376,574 B2 * 2/2013 Spartano ................. F21L 4/045 362/205
10,473,288 B2 * 11/2019 Maier ....................... G01J 3/46
2012/0176780 A1 * 7/2012 Gross ....................... F21L 4/027 362/184

(Continued)

*Primary Examiner* — William J Carter

(74) *Attorney, Agent, or Firm* — Thorpe North & Western, LLP; Jed H. Hansen

(57) ABSTRACT

A hand-held lighting device is disclosed with a handle and a head housing a first and second light source, wherein a longitudinal axis of the head is disposed at a non-parallel angle with respect to a longitudinal axis of the handle. The first light source is annular light emitting diode and the second light source is a light excited phosphor.

20 Claims, 7 Drawing Sheets

(56) References Cited

U.S. PATENT DOCUMENTS

2012/0182748 A1* 7/2012 McCaslin ............... F21V 23/06
362/105

* cited by examiner

HAND HELD SPOTLIGHT

PRIORITY CLAIM

The present application claims priority as a Continuation to U.S. application Ser. No. 18/460,990 filed on Sep. 5, 2023, which claims priority as a Continuation to U.S. application Ser. No. 17/846,875 filed on Jun. 22, 2022 entitled “Hand Held Spotlight”, and claims benefit of U.S. Provisional Application Ser. No. 63/242,799 filed on Sep. 10, 2021 entitled “Spotlight”, all of which are incorporated herein by reference in their entireties.

FIELD OF THE INVENTION

The present invention relates generally to lighting devices, systems, and associated methods and more particularly to an improved apparatus and system for providing an improved hand-held spotlight with area light capabilities.

BACKGROUND

Lighting devices are commonly used to provide illumination both at close range and at a distance. However, several disadvantages in current lighting are overcome by aspects of the current technology. Including, but without limitation, the ability to throw a spotlight a significant distance while also have area illumination, in a compact, hand-held device that contains its own power source and is ergonomically superior. Other advantages are apparent in the description of aspects of the technology.

BRIEF DESCRIPTION OF THE DRAWINGS

To further clarify the above and other aspects of the present technology, a more particular description of the invention will be rendered by reference to specific aspects thereof which are illustrated in the appended drawings. It is appreciated that these drawings depict only typical aspects of the technology and are therefore not to be considered limiting of its scope. The drawings are not drawn to scale. The technology will be described and explained with additional specificity and detail through the use of the accompanying drawings in which.

DESCRIPTION OF ASPECTS

Figure 1:
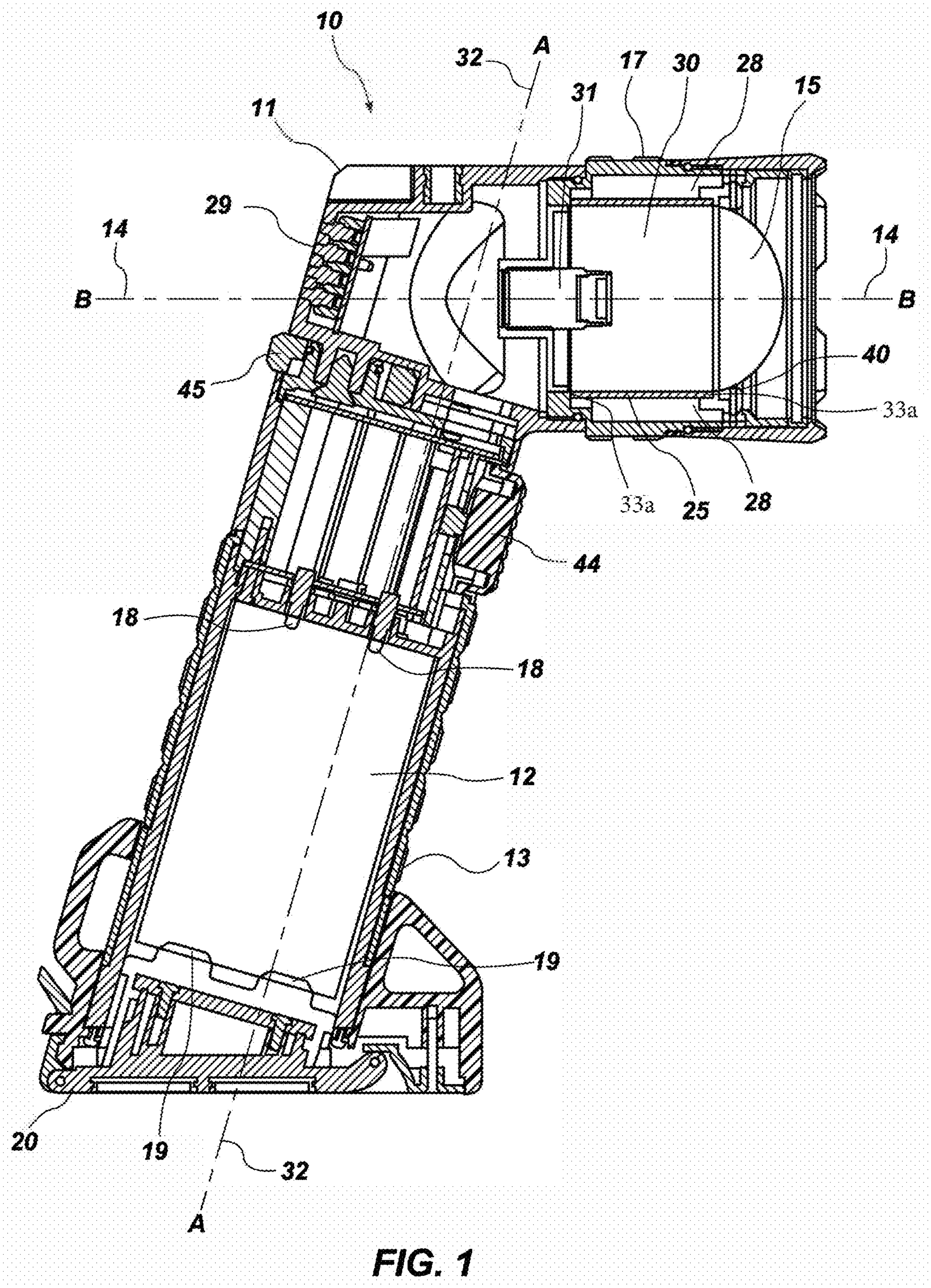
FIG. 1 is a cross sectional side view of a lighting device in accordance with one aspect of the technology.

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this specification and the appended claims, the singular forms “a,” “an” and “the” include plural referents unless the context clearly dictates otherwise. Thus, for example, reference to “a layer” includes a plurality of such layers.

In this disclosure, “comprises,” “comprising,” “containing” and “having” and the like can have the meaning ascribed to them in U.S. Patent law and can mean “includes,” “including,” and the like, and are generally interpreted to be open ended terms. The terms “consisting of” or “consists of” are closed terms, and include only the components, structures, steps, or the like specifically listed in conjunction with such terms, as well as that which is in accordance with U.S. Patent law. “Consisting essentially of” or “consists essentially of” have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the “consisting essentially of” language, even though not expressly recited in a list of items following such terminology. When using an open ended term, like “comprising” or “including,” it is understood that direct support should be afforded also to “consisting essentially of” language as well as “consisting of” language as if stated explicitly and vice versa.

The terms “first,” “second,” “third,” “fourth,” and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms “left,” “right,” “front,” “back,” “top,” “bottom,” “over,” “under,” and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein. The term “coupled,” as used herein, is defined as directly or indirectly connected in an electrical or nonelectrical manner. Objects described herein as being “adjacent to” each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 angstroms to about 80 angstroms" should also be understood to provide support for the range of "50 angstroms to 80 angstroms."

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to devices, structures, systems, or methods that provide "improved" performance. It is to be understood that unless otherwise stated, such "improvement" is a measure of a benefit obtained based on a comparison to devices, structures, systems or methods in the prior art. Furthermore, it is to be understood that the degree of improved performance may vary between disclosed embodiments and that no equality or consistency in the amount, degree, or realization of improved performance is to be assumed as universally applicable.

EXAMPLE EMBODIMENTS

An initial overview of technology embodiments is provided below and specific technology embodiments are then described in further detail. This initial summary is intended to aid readers in understanding the technology more quickly, but is not intended to identify key or essential features of the technology, nor is it intended to limit the scope of the claimed subject matter.

Broadly speaking, aspects of the disclosed technology create an improved spot light configured and equipped with area lighting elements so that the focused spotlight element may be employed concurrently or alternatively with an area lighting element. In certain aspects of lighting technology, the spot light element comprises a light emitting diode (LED) or a laser excited phosphor (LEP) disposed within a light emitting chamber. In one aspect, the area light element comprises an annular substrate with one or more LEDs disposed about the annular substrate and configured such that the spot light element emits light through the center of the annular substrate. In an aspect where the LEP 31 is used, there is no need for a concave or conical reflector to gather and focus a spotlight beam in a forward direction thus allowing a smaller overall form factor of the lighting device while still maintaining a significant "throw" for the spotlight feature.

Figure 2:
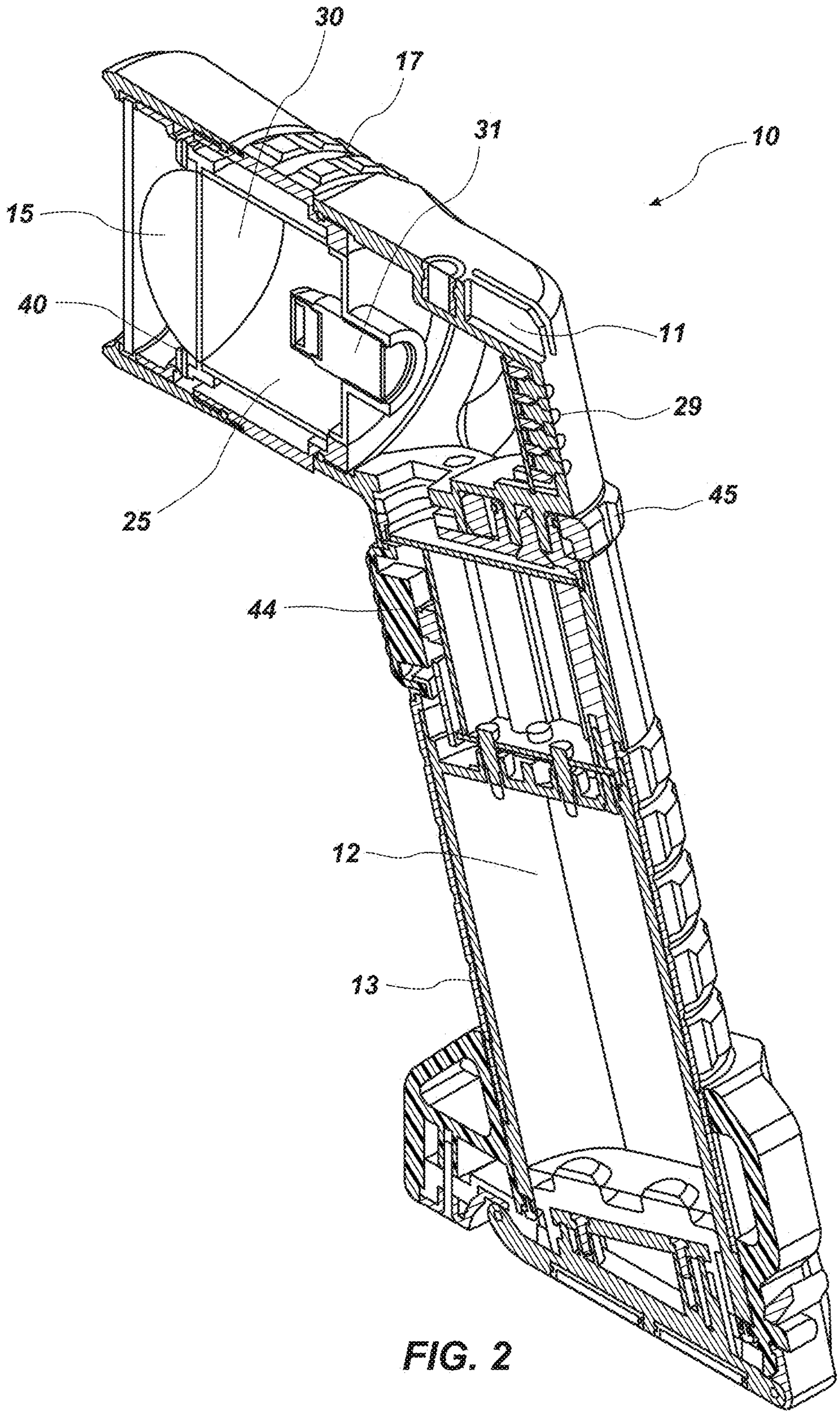
FIG. 2 is a cross sectional perspective view of a lighting device in accordance with one aspect of the technology.
Figure 3:
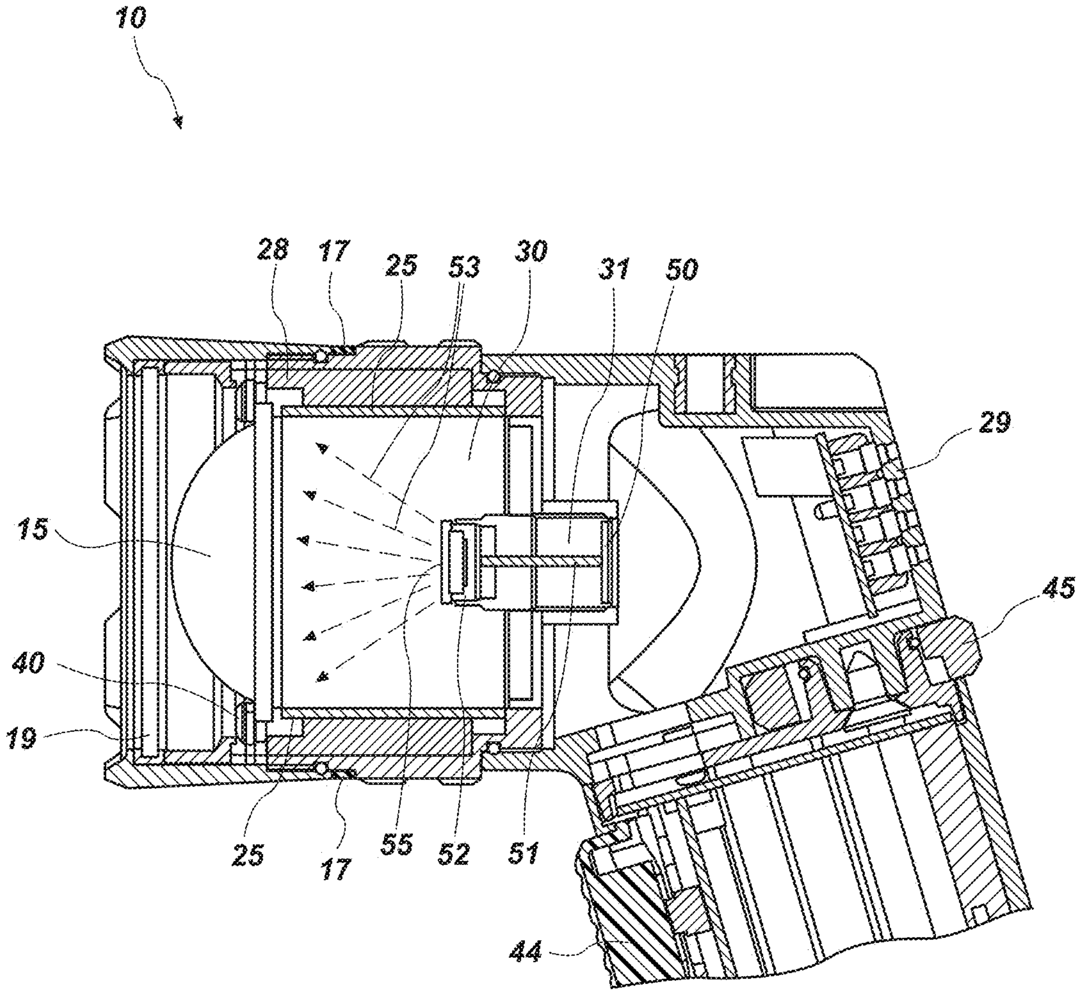
FIG. 3 is a cross sectional side view of a portion of a lighting device in accordance with one aspect of the technology.
Figure 4:
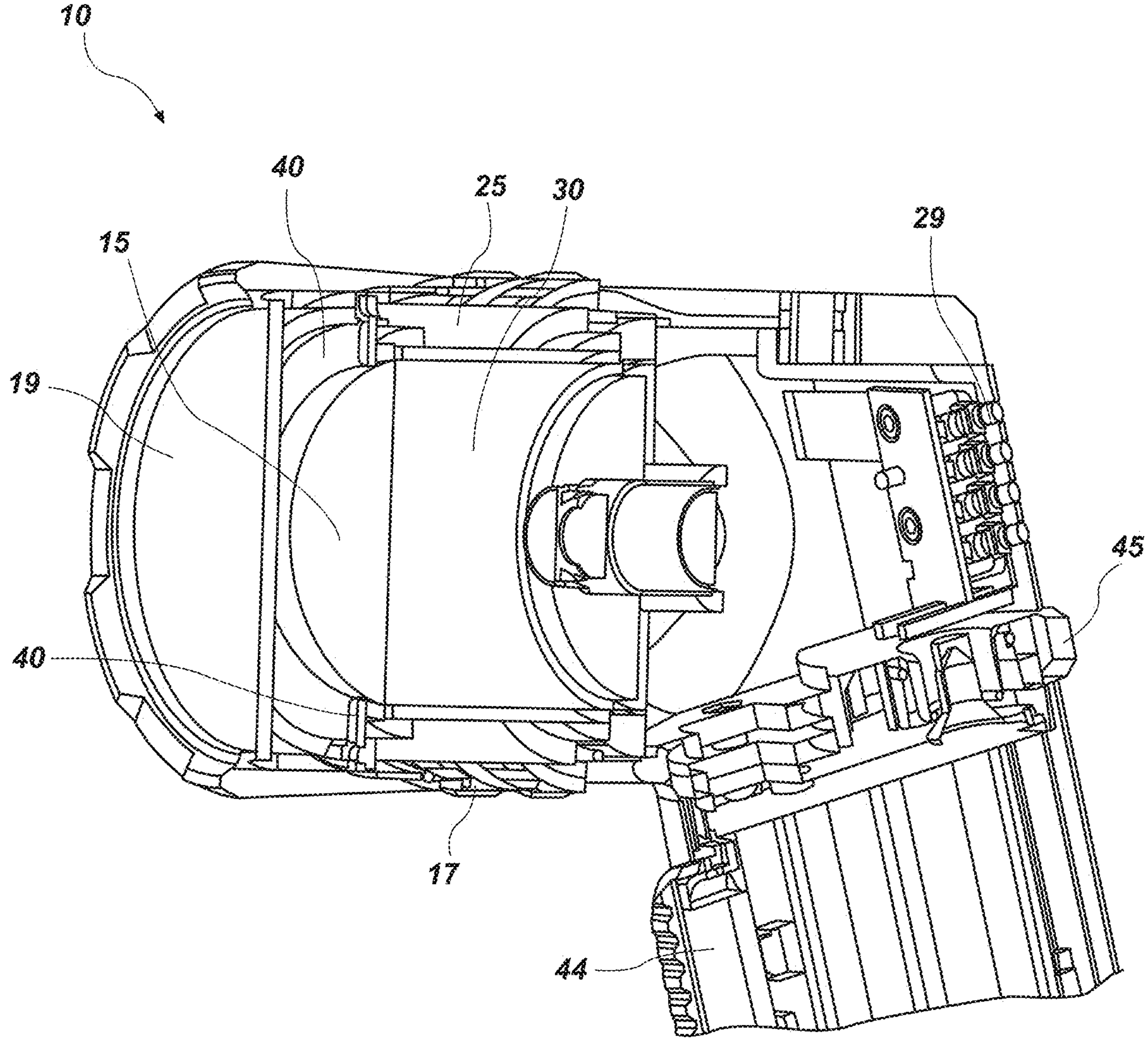
FIG. 4 is a cross sectional perspective view of a portion of a lighting device in accordance with one aspect of the technology.
Figure 5:
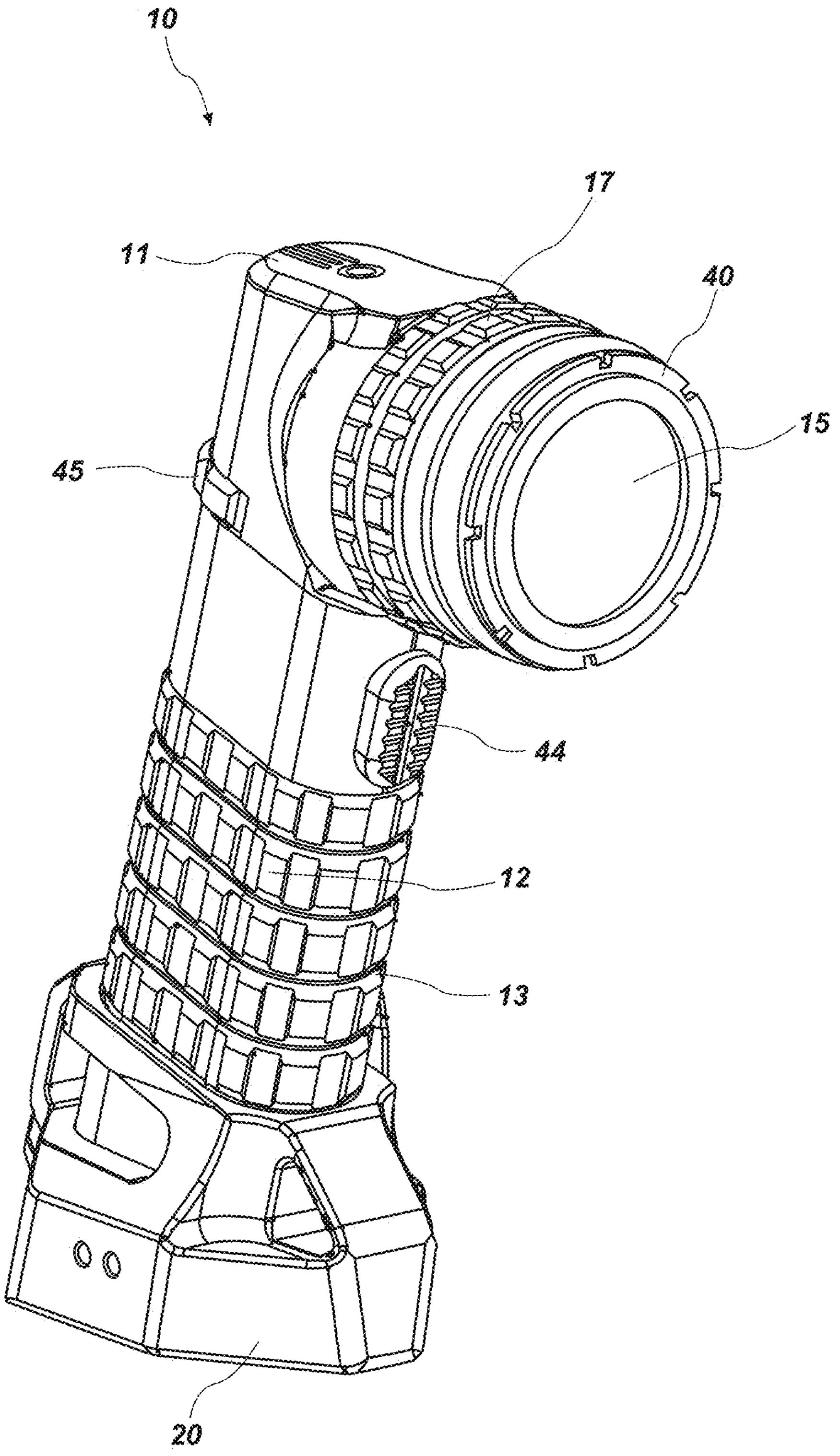
FIG. 5 is a perspective view of a lighting device in accordance with one aspect of the technology.
Figure 6:
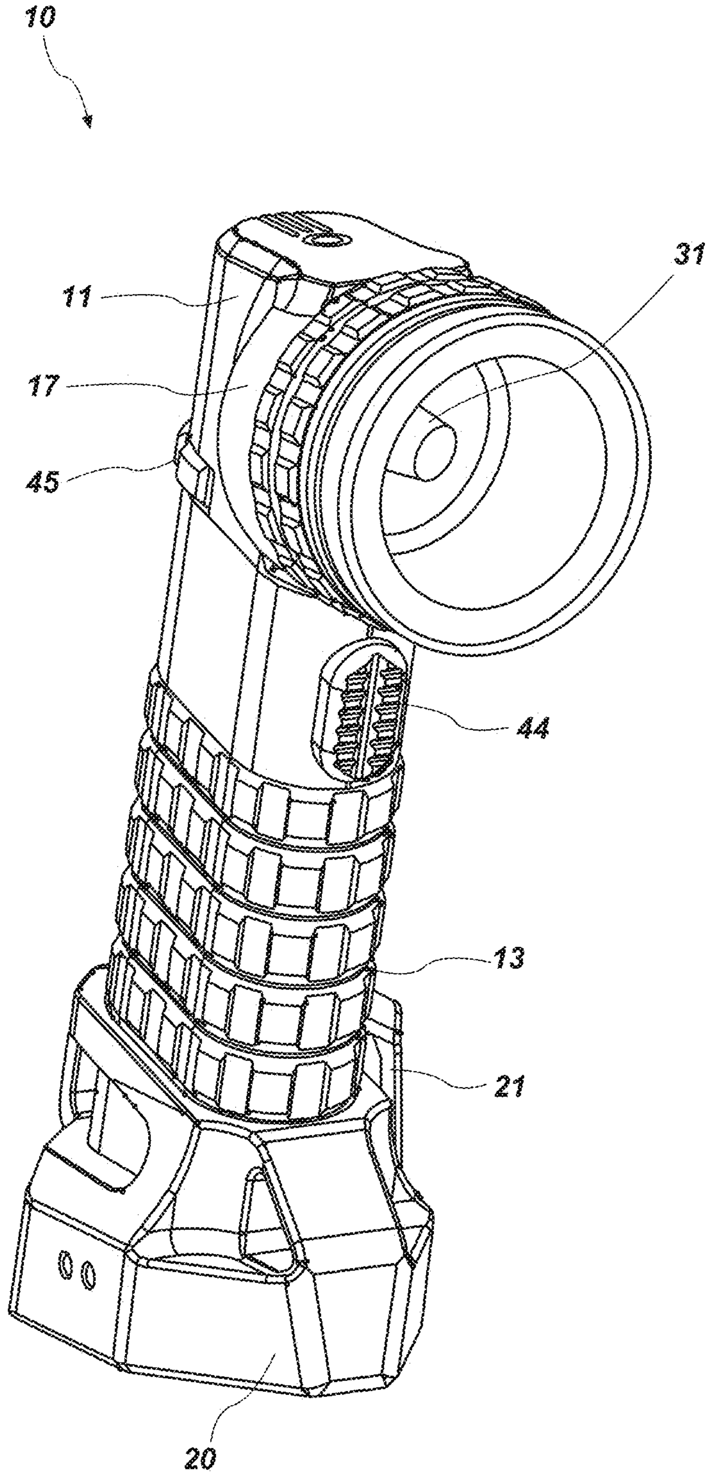
FIG. 6 is a perspective view of a lighting device in accordance with one aspect of the technology.
Figure 7:
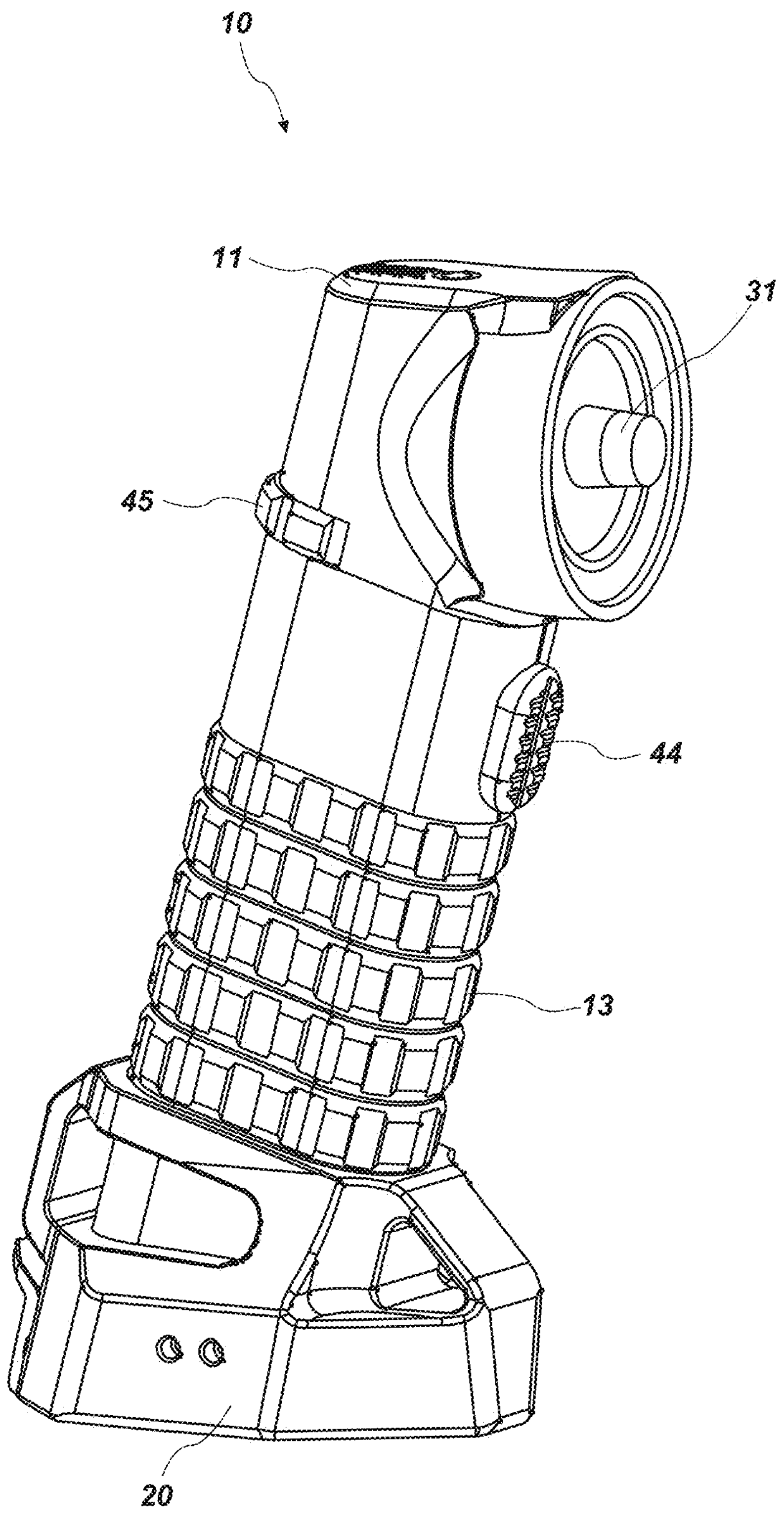
FIG. 7 is a perspective view of a lighting device in accordance with one aspect of the technology.

With reference now to the figures, FIGS. 1 through 7 illustrate one example of a hand-held lighting device 10. The lighting device 10 generally comprises an outside housing 11 configured with a first cavity 12 for a rechargeable power source (e.g., a battery) disposed within a handle 13 of the device 10. The housing 11 further comprises a second cavity 30 with a primary light source 31, a secondary light source 40, and a fixed lens 15 disposed there. In one aspect of the technology, the second cavity 30 is disposed above the handle 13 and oriented such that the direction of light emitted from both the primary light source 31 and the secondary light source 40 is not parallel to the longitudinal axis 32 along line A-A of the handle 13. Meaning, the longitudinal axis 32 A-A of the handle 13 is not parallel with the longitudinal axis 14 along line B-B. In one aspect of the technology, the handle 13 comprises a substantially elliptical geometry having a major axis and a minor axis. The major axis of the elliptically shaped handle 13 is normal to the longitudinal axis 32 of line A-A through the first cavity 12 of handle 13.

In one aspect of the technology, in contrast to the elliptical geometry of the handle 13, the second cavity 30 and the portion of housing 11 that envelops the primary and second light sources and the lens 15, is cylindrical.

In one aspect of the technology, the major axis of the elliptical geometry of the handle 13 is greater than the diameter of the cylindrical second cavity 30. In another aspect, the major axis of the elliptical geometry of the handle 13 is substantially the same as the diameter of the cylindrical second cavity 30. In yet another aspect, the major axis of the elliptical geometry of the handle 13 is less than the diameter of the cylindrical second cavity 30.

While reference is made to the diameter of the cylindrical second cavity 30, the comparisons of the major axis of the elliptical geometry of the handle 13 are also applicable to the outside cylinder or barrel 17 that forms part of the outside of housing 11. In one aspect, the outside cylinder or barrel 17 encloses a second cylinder or barrel 25, the second cylinder 25 defining, at least in part, the second cavity 30. In one aspect, a void 28 is located between the second cylinder 25 and outside cylinder 17. In another aspect of the technology, the major axis of the elliptical geometry of the handle 13 is greater than the diameter of the lens 15. In another aspect, the major axis of the elliptical geometry of the handle 13 is substantially the same as the diameter of the lens 15. In yet another aspect, the major axis of the elliptical geometry of the handle 30 is less than the diameter of the lens 15.

In another aspect of the technology, the geometry of the cavity 30 is conical having a first diameter near LEP 31 that is smaller than a second diameter near lens 15. In that aspect, the lens 15 is substantially flat on both a front and back side of the lens 15 rather than having a flat back side (i.e., the side facing the LEP 31) and a curvilinear front side (i.e., the side facing outward of the LEP 31). In one aspect, the inside of cavity 30, is characterized by a conical wall and is coated with a reflective material or comprises a reflective material.

In one aspect of the technology, handle 13 comprises a substantially flat base 20 with a belt clip 21 attached thereto. Prior spotlight devices have been configured in such a way that attachment to a belt was impractical or impossible due, in part, to the size of the head required to produce a useable spot light. Aspects of the current technology provide for a more compact head that allows the user to attach the light to a utility belt for quick access and deployment with a single hand. In other aspects, a clip may be attached near a top of the handle 13 or near the head of the light.

In addition, the base 20 is configured such that the entire device 10 may be disposed about a flat surface and remain in a standing position without any additional support. In one aspect, a surface area of the substantially flat base 20 is greater than an area of a circle created by an imaginary cross section through the second cavity 30. In this manner, while the device 10 is in a "standing" position, and the second cavity 30 is not axially aligned or disposed above the flat base 20, the base 20 keeps the device 10 in a balanced state.

In one aspect of the technology, the base 20 is pivotally attached to handle 13 and may be removed so that cavity 12 is accessible to insert and/or remove batteries into the first cavity 12. A plurality of electrical contacts 18 are located on the base 20 and at the top of cavity 12 and are configured to couple with batteries disposed within the first cavity 12. A plurality of status indicator lights 29 are disposed about the back side of the device 10 near a top above the handle 13 which can provide status as to the amount of charge remaining in the batteries.

The housing 11 further comprises a power switch 44, a control switch 45, and a logic controller such as a programmable logic controller or PLC. The control switch 45 is also coupled to the PLC and permits the user to switch between different modes of operation including, but without limitation, powering just the first light source 31, just the second light source 40, or both the first and second light sources (31, 40) concurrently. A PLC is a digital computer used for automation of certain electromechanical processes, such as control of machinery on factory assembly lines, amusement rides, or light fixtures. PLCs are designed for multiple arrangements of digital and analog inputs and outputs, extended temperature ranges, immunity to electrical noise, and resistance to vibration and impact. In one aspect of the technology, the instructions to control operation of the lighting device operation are stored in battery-backed-up or non-volatile memory. Memory refers to electronic circuitry that allows information, typically computer data, to be stored and retrieved.

As will be appreciated by one skilled in the art, aspects of the present technology may be embodied as a system, method or computer program product used in connection with a lighting device. Accordingly, aspects of the present technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a random access memory (RAM), a read-only memory (ROM), an erasable programmable read-only memory (EPROM or Flash memory), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present technology may be written in any combination of one or more programming languages, including an object oriented programming language such as Java, Visual Basic, SQL, C++ or the like and conventional procedural programming languages, such as the "C" programming language or similar programming languages.

With reference to FIGS. 1 through 7, in one aspect of the technology, the primary or first light source 31 comprises an LEP disposed within the second cavity 30. The second cavity comprises a cylindrical light emission chamber with the LEP 31 disposed about a first end 33*a* and a fixed lens 15 disposed about a second end 33*b*. The LEP 31 is configured to propagate light in a direction that is parallel with the longitudinal axis 14 along line B-B of the cavity 30. In one aspect of the technology, the LEP 31 is fixedly disposed a predetermined distance away from the back of lens 15. In another example, however, the LEP 31 is mounted to a sliding assembly that is coupled to a rotating or linearly sliding element about the outside of housing 11 so that the LEP 31 may be moved closer to the back of lens 15 or away from lens 15. In another aspect, the lens 15 is moveable in an axial direction with respect to both the COB LED 40 and the LEP 31. In another aspect, the lens 15 and the COB LED 40 are fixed together so that any movement in an axial direction of the lens 15 also includes movement of COB LED 40.

In one aspect of the technology, the LEP 31 comprises a laser diode 50 in the form of a semiconductor laser, for example, disposed about a back or rear side of a cylinder. In one aspect, the laser diode 50 may, for example, provide coherent light within the range of 400-480 nm and 430-470 nm. Beam 51 from the laser diode is the coherent beam of laser light. Beam 51 is propagated in a direction that is parallel with a longitudinal axis of the head of the light 10. The beam 51 strikes, and interacts with, a spectrum converter 52 disposed about a front side of the cylinder. In one aspect, the spectrum converter 52 comprises an epoxy, silicone-based compound, ceramic compound, or synthetic polymer such as acrylic or methyl methylacrylate, all containing particles of phosphor. Converter 52 converts the incoming coherent laser beam 51 from laser diode 50 into outgoing broad spectrum light 53 in a direction that is parallel with a longitudinal axis of the head of light 10. The light 53 may be of any specified color, such as, but not limited to, white light (about 380 nm to about 780 nm), red light (about 620 nm to about 750 nm), green light (about 490 nm to about 570 nm), blue light (about 450 nm to about 490 nm), ultraviolet light (about 10 nm to about 400 nm), or infrared light (about 780 nm to about 1 mm), and is a function of the chemical composition of the phosphor disposed in the spectrum converter 52.

In one aspect of the technology, the phosphors in the spectrum converter 52 comprise oxynitride phosphors or nitride phosphors, and emit light of different colors such as blue, green, and red. In an instance where the laser light source 50 includes a GaN-based semiconductor laser, the laser light source 50 emits a laser beam having a wavelength between 400 and 410 nm, 400 and 450 nm, or 440 and 460 nm. In one aspect, the phosphors include (i) yellow phosphors or (ii) a mixture of green phosphors and red phosphors. Yellow phosphors emit light having a wavelength that range from about 560 nm to about 590 nm. Green phosphors emit light having a wavelength that ranges from about 510 nm to about 560 nm. Red phosphors emit light having a wavelength that ranges from about 600 nm to about 680 nm.

In one aspect of the technology, the phosphors comprise oxynitride phosphors or nitride phosphors or sialon phosphors. Sialon is a substance in which the silicon atoms and nitrogen atoms in silicon nitride are partially substituted by aluminum atoms and oxygen atoms, respectively. Sialon phosphors can be prepared by making a solid solution of silicon nitride (Si3N4), aluminum oxide (Al2O3), silica (SiO2), and/or a rare earth. Another example of the phosphors is semiconductor nanoparticle phosphors made of nanometer-size III-V compound semiconductor particles. Semiconductor nanoparticle phosphors has a characteristic that even in a case where they are made of a single compound semiconductor (for example, indium phosphide [InP]), it is possible to change a color of emission light with use of a quantum size effect caused by changing a particle diameter of the semiconductor nanoparticle phosphors. For example, semiconductor nanoparticle phosphors made of InP emit red light in a case where it has a particle size ranges from about 3 nm to about 4 nm. In another aspect, the LEP comprises a composite ceramic comprising yttrium aluminum garnet, activated by cerium ions Ce3+:YAG, and aluminum oxide Al2O3.

In one aspect of the technology, secondary light source 40 comprises a "chip-on-board" or COB light source which specifically refers to light emitting diode (LED) chips in the form of a semiconductor chip that is neither encased nor connected but directly mounted onto a substrate, such as a PCB. As such, a plurality of semiconductor light sources may be configured on the same substrate. While reference is made herein to COB LED lights, aspects of the technology are not limited to that specific aspect. Different LED lights/light sources may suffice so long as the light source 40 functions as an "area" light. An "area" light is a light that provides illumination about the immediate area of the user. Advantageously, the "area" light 40 provides immediate illumination for the user if needed, while the spotlight 31 throws a beam of light a significant distance to illuminate a distant target.

In one aspect, the secondary or second light source 40 is an annular COB LED that is disposed about the second end 33 of the cavity 30 and about the outer perimeter of base of the lens 15. In one aspect, the lens 15 is a convex lens having a substantially flat base and a curvilinear top. With the annular COB LED 40 disposed about the outer perimeter of base, light from LEP 31 that is collimated by lens 15 functions as a spot light, while light from the annular COB LED 40 serves as an area light. Advantageously, with the COB LED 40 mounted at the base of the convex lens 15 and outside the inner perimeter of cavity 30, the two light sources can operate independently of one another without significant overlap in light transmission.

In one aspect of the technology, the device 10 is used without lens 15. Rather, a collimating lens 55 or collimating device is disposed about the distal end of LEP 31. Light propagated from LEP 31 passes through the outer flat lens 19 of device 10. However, in another aspect, a collimating lens is disposed about the distal end of LEP 31 and the distal end of the handheld device (as shown at 15).

While reference is made herein to primary and secondary light sources, or first and second light sources, those terms are meant to be interchangeable in identifying the different light sources used in conjunction with the current technology. Meaning LEP 31 or annular COB LED 40 may be referred to interchangeably as primary or secondary, or first or second, so long as the two are identifiably distinct from one another.

Aspects of the technology permit the user to have an area light from annular light emitting diode 40, for example, and a spot light from LEP 31 that throws a beam of light for a significant distance while still being measurable at a significant lumen strength. In one aspect, the device 10 is capable of producing a beam of light that measures 640,000 candela with an effective distance of 1 mile. In another aspect, the device 10 is capable of producing a beam of light that measures 500 lumens with an effective distance of 137 feet. In another aspect the device 10 is capable of producing a beam of light that measures between about 620,000 to about 640,000 candela at an effective distance of between about 0.8 and about 1 mile. In another aspect, the device 10 is capable of producing a beam of light that measures between about 400 lumens and about 500 lumens with an effective distance of between about 120 and 137 feet.

In one aspect of the technology, the PLC is configured to regulate the pulse-width-modulation (or PWM) of the LEP 31 or COB LED 40 at a plurality of different duty cycles in a plurality of different sequences. PWM is one way of regulating the brightness of a light. In one aspect, light emission from the LEP 31 and/or COB LED 40 is controlled by pulses wherein the width of these pulses is modulated to control the amount of light perceived by the user of the lighting device. When the full direct current voltage runs through an LEP 31 and/or the COB LED 40, the maximum of light is emitted 100% of the time. That is, the light sources emit light 100% of the time when in an "ON" mode. With PWM, the voltage supplied to the light sources can be "ON" 50% of the time and "OFF" 50% of the time so that the light sources give off its maximum amount of light only 50% of the time. This is referred to as a 50% duty cycle. In this scenario, if the ON-OFF cycle is modulated fast enough, human eyes will perceive only half the amount of light coming from the light sources. That is, with such an input on the light sources, the amount of light given off appears diminished by 50%. While specific reference is made to a 50% duty cycle, the duty cycle of the light sources described herein may be greater or lesser than 50% as suits a particular purpose. In one aspect, the PLC, power source, control switch 45, and different light sources are all operably coupled together.

In one aspect of the technology, LEP 31 lights require a driver in order to provide/deliver a desired output. The driver may be internally or externally incorporated into the LEP 31 and can be either constant current or constant voltage. Both constant current and constant voltage drivers act as a power supply for an LEP 31 light source. LEP drivers provide and regulate the necessary voltage in order to maintain operation of the LEP 31. In one aspect of the technology, a constant current LEP driver operates within a range of output voltages and a fixed output current (amps). An LEP 31 is rated to operate at a forward voltage with an associated current, and a supply is needed to deliver the required operational voltage and current. In one aspect, a constant current driver varies the voltage along an electronic circuit which allows a constant electrical current through the LEP 31 device. In one aspect of the technology, a constant voltage driver operates on a single direct current (DC) output voltage (e.g., 12 VDC or 24 VDC, etc.). The driver will maintain a constant voltage no matter the load current. In one aspect of the technology, the power mode of the lighting device may be changed by changing the current that is available from the LEP 31 drive circuitry. In one aspect of the technology, an electronic circuit comprises an overall voltage supply that is high enough to span the number of LEPs in series (e.g., 3.2V is a forward voltage rating for each of three LEPs, etc.), and a 10 Ohm resistor component is used to set the desired current. By varying the resistor, brightness of the LEPs is varied up to the forward current limitation of the LEP 31. Of course, different forward voltage ratings and different resistors, or other circuit components, may be used as a means of regulating constant current in an LEP device.

It is noted that no specific order is required in these methods unless required by the claims set forth herein, though generally in some embodiments, the method steps can be carried out sequentially.

The foregoing detailed description describes the technology with reference to specific exemplary aspects. However, it will be appreciated that various modifications and changes can be made without departing from the scope of the present technology as set forth in the appended claims. The detailed description and accompanying drawing are to be regarded as merely illustrative, rather than as restrictive, and all such modifications or changes, if any, are intended to fall within the scope of the present technology as described and set forth herein.

More specifically, while illustrative exemplary aspects of the technology have been described herein, the present technology is not limited to these aspects, but includes any and all aspects having modifications, omissions, combinations (e.g., of aspects across various aspects), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus-function are expressly recited in the description herein. Accordingly, the scope of the invention should be determined solely by the appended claims and their legal equivalents, rather than by the descriptions and examples given above.

The invention claimed is:

1. A hand-held lighting device, comprising:
- a handle;
- a head disposed about a top of the handle comprising a first and second light source, wherein a longitudinal axis of the head is disposed at an angle greater than 90 degrees but less than 180 degrees with respect to a longitudinal axis of the handle;
- wherein the first light source comprises an annular light emitting diode disposed about the head and oriented to direct light in a direction parallel with the longitudinal axis of the head;
- wherein the second light source is disposed about the head and oriented to direct light in a direction parallel with the longitudinal axis of the head;
- a lens disposed about the second light sources configured to pass light from the second light source in a direction parallel with the longitudinal axis of the head;
- a base coupled to the handle, the base comprising a flat bottom configured to rest on a surface;
- wherein when the base is disposed on a surface normal to a direction of gravity, the annular light emitting diode is disposed in a vertical plane that does not intersect the base; and
- wherein when the base is disposed on a surface normal to the direction of gravity, the lens is disposed in a vertical plane that does not intersect the base.

2. The lighting device of claim 1, wherein the second light source comprises a light excited phosphor comprises a coherent laser light source propagated onto a ceramic substrate.

3. The lighting device of claim 2, wherein the light excited phosphor comprises a cylinder with a laser diode disposed about a proximal end and a phosphor substrate disposed about a distal end.

4. The lighting device of claim 1, wherein the second light source is disposed behind the first light source within the head of the device.

5. The lighting device of claim 1, wherein the second light source is disposed at the proximal end of one of a cylindrical chamber or a conical chamber within the head of the lighting device.

6. The lighting device of claim 1, wherein the handle has an elliptical geometry and the head has a cylindrical geometry.

7. The lighting device of claim 1, wherein a width of the handle is greater than a diameter of the head.

8. A hand-held lighting device, comprising:

a handle having a major axis and a minor axis, the major axis and minor axis being normal to a longitudinal axis of the handle, the major axis being normal to the minor axis;

a head disposed about a top of the handle, the head comprising a first and second light source and a lens, the first light source comprising an annular light emitting diode;

wherein a longitudinal axis of the head is disposed at an angle that is non-parallel to the longitudinal axis of the handle;

a base coupled to the handle, the base comprising a flat bottom configured to rest on a surface;

wherein when the base is disposed on a surface normal to a direction of gravity, the annular light emitting diode disposed in a vertical plane that does not intersect the base; and wherein when the base is disposed on a surface normal to the direction of gravity, the lens is disposed in a vertical plane that does not intersect the base.

9. The lighting device of claim 8, wherein the second light source comprises a light excited phosphor and is shaped to approximate a cylinder having a first end and a second end, the second end comprising a laser diode configured to propagate a beam of coherent laser light in a direction parallel with the longitudinal axis of the head.

10. The lighting device of claim 9, wherein the beam of coherent laser strikes a spectrum converter disposed about the first end of the second light source, the spectrum converter converts the laser light to white light and propagates the white light in a direction parallel with the longitudinal axis of the head.

11. The lighting device of claim 9, wherein the lens is disposed about a distal end of the light excited phosphor, the light excited phosphor configured to propagate white light in a direction parallel with a longitudinal axis of the head and through an opening in the annular light emitting diode.

12. The lighting device of claim 9, wherein the light excited phosphor comprises a spectrum converter, the spectrum converter comprising an epoxy, silicone, ceramic, or synthetic polymer.

13. The lighting device of claim 8, further comprising a base disposed about a bottom of the handle, the base comprising a substantially flat bottom having a surface area greater than the area of an imaginary plane passing through the head of the device at an angle normal to the longitudinal axis of the head.

14. The lighting device of claim 13, wherein the bottom of the base is parallel with the longitudinal axis of the head.

15. The lighting device of claim 14, wherein an axis normal to the longitudinal axis of the head passes through the second light source in the direction of the base but does not pass through the base.

16. A method of propagating light with a hand-held device:

activating a first light source disposed about a head of the hand-held device coupled to a handle and a base, said first light source comprising an annular light emitting diode disposed about a distal end of the head of the hand-held device, the annular light emitting diode comprising a void within the interior of an annular light emitting diode;

activating a second light source through the void of the light emitting diode, said second light source disposed about the head of the hand-held light device, said second disposed behind the first light source and behind a lens;

propagating a beam of light from the second light source through the void of the first light source and through the lens;

wherein when the base is disposed on a surface normal to a direction of gravity, the annular light emitting diode and lens are disposed in a vertical plane that does not intersect the base.

17. The method of claim 16, wherein the handle comprises:

a longitudinal axis disposed at an angle that is non parallel with a longitudinal axis of the head;

a major axis and a minor axis forming an elliptical geometry, wherein the major axis is disposed at an angle parallel with a longitudinal axis of the head.

18. The method of claim 17, wherein the handle comprises a power source disposed within a base of the handle.

19. The method of claim 16, further comprising propagating a beam of light from the second light source wherein the beam of light comprises an intensity of 640,000 candela with an effective distance of 1 mile from the second light source.

20. The method of claim 16, wherein the head comprises a diameter that is less than or equal to a width of the handle.

* * * * *